United States Patent
Polowniak et al.

(10) Patent No.: US 11,613,424 B1
(45) Date of Patent: Mar. 28, 2023

(54) WASTE TRANSFER FACILITY

(71) Applicants: Shawn Polowniak, Treasure Island, FL (US); Christopher Starr, Leawood, KS (US)

(72) Inventors: Shawn Polowniak, Treasure Island, FL (US); Christopher Starr, Leawood, KS (US)

(*) Notice: Subject to any disclaimer, the term of this patent is extended or adjusted under 35 U.S.C. 154(b) by 0 days.

(21) Appl. No.: 17/476,271

(22) Filed: Sep. 15, 2021

(51) Int. Cl.
  *B65F 9/00* (2006.01)
  *B09B 5/00* (2006.01)
  *B03B 9/06* (2006.01)

(52) U.S. Cl.
  CPC .............. *B65F 9/00* (2013.01); *B03B 9/06* (2013.01); *B09B 5/00* (2013.01)

(58) Field of Classification Search
  CPC ........ B65F 9/00; B65F 2001/008; B03B 9/06; B09B 5/00
  See application file for complete search history.

(56) References Cited

U.S. PATENT DOCUMENTS

| | | | | |
|---|---|---|---|---|
| 3,561,624 A | * | 2/1971 | Thurmond | B65F 9/00 100/190 |
| 3,753,506 A | * | 8/1973 | Palmer | B30B 9/3042 52/196 |
| 3,962,965 A | * | 6/1976 | Corompt | B65F 9/00 414/397 |
| 4,044,905 A | * | 8/1977 | Liberman | B30B 9/3042 414/416.04 |
| 6,136,590 A | * | 10/2000 | Kruse | C05F 9/02 241/DIG. 38 |
| 11,017,049 B2 | * | 5/2021 | Flood | G06K 7/10297 |
| 2005/0080520 A1 | * | 4/2005 | Kline | B65F 1/062 701/1 |
| 2009/0008298 A1 | * | 1/2009 | Studley | F23G 5/006 15/1 |
| 2018/0311711 A1 | * | 11/2018 | Zhao | B02C 19/0075 |

* cited by examiner

*Primary Examiner* — Joseph C Rodriguez
(74) *Attorney, Agent, or Firm* — Bryan Cave Leighton Paisner LLP

(57) ABSTRACT

This disclosure relates to a waste transfer facility. The waste transfer facility includes a first level, the first level positioned at a first height, the first level including a first side, and a second side. The waste transfer facility also includes a second level, the second level positioned at a second height different than the first height, the second level including a plurality of waste receptacles, the plurality of waste receptacles including a first waste receptacle positioned adjacent to the first side to receive waste, a second waste receptacle positioned adjacent to the second side to receive waste, and a non-compliant waste receptacle to receive non-compliant waste, the non-compliant waste to be removed from the waste.

13 Claims, 4 Drawing Sheets

WASTE TRANSFER FACILITY

TECHNICAL FIELD

The present disclosure is directed to waste management, in particular a waste transfer facility.

BACKGROUND

Waste transfer facilities are often used within communities to assist with waste management. Typical activities at a waste transfer facility involve unloading waste from garbage trucks, compacting the waste, and reloading the compacted waste onto vehicles for transport to a disposal site.

BRIEF DESCRIPTION OF DRAWINGS

To facilitate further description of the embodiments, the following drawings are provided, in which like references are intended to refer to like or corresponding parts, and in which.

Figure 1:
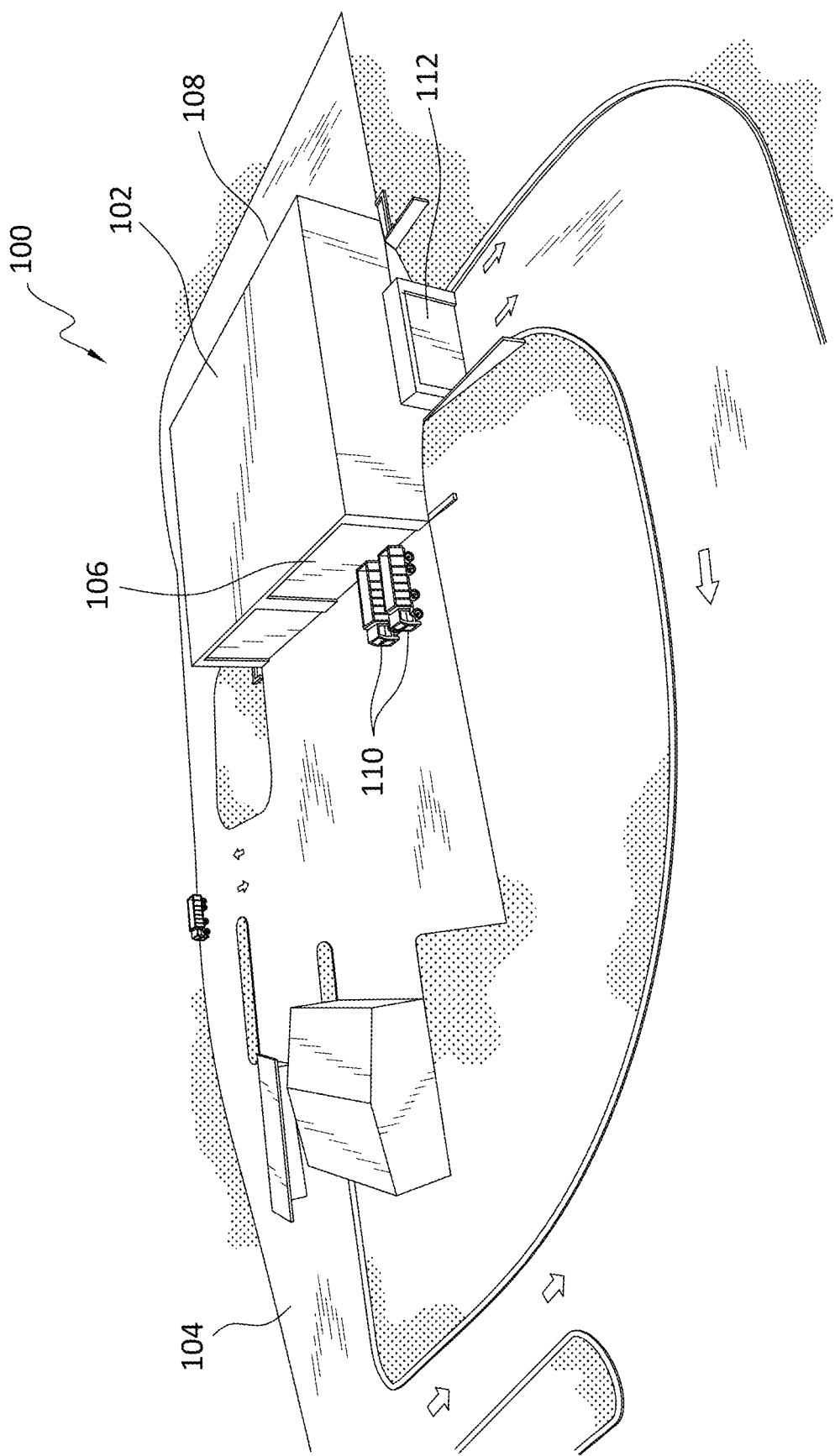
FIG. 1 is a top perspective view of an exemplary waste transfer facility according to certain embodiments.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Coupling may be for any length of time, e.g., permanent or semi-permanent or only for an instant. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DETAILED DESCRIPTION OF EXEMPLARY EMBODIMENTS

The present disclosure relates to a waste transfer facility. Waste transfer facilities are a common component of community waste management programs. However, waste transfer facilities include a number of drawbacks for the community itself including: i) increased waste vehicle traffic near a waste transfer facility, ii) noise associated with waste vehicles, work vehicles and machines associated with the waste transfer facility, iii) odors from the waste, iv) rodents, birds, and other wildlife attracted to the waste, and v) litter from the waste from waste vehicles or the waste transfer station.

The waste transfer facility of the disclosed embodiments provides some of the following benefits: fuel savings for waste management company, reduction in road wear for associated community, reduction in air pollution due to fewer waste vehicles being on the road, recyclable material drop-off locations for residents of the community, reduced traffic congestion in the community by consolidating loads onto larger vehicles, reduced truck traffic and improved safety at disposal site, and improved screening to removing non-compliant (e.g., hazardous) waste or recovering recyclables.

The waste transfer facility of the disclosed embodiments is more efficient because the loading of waste from one vehicle to a waste receptacle does not require any additional steps to transfer the waste to another vehicle. In addition, waste does not stay in the waste transfer facility long, thereby reducing the smell emitted into the community. Further, the waste transfer facility of disclosed embodiments reduces litter and leaching waste by directly transferring waste from a waste vehicle to a waste receptacle, which is subsequently removed. The waste transfer facility of disclosed embodiments further reduces unwanted wildlife (e.g., rats, mice, cats, etc.) because the waste is transferred from a waste vehicle to a waste receptacle and does not remain on the ground, or in the waste transfer facility for extended periods of time.

Waste transfer facilities disclosed herein also actively screen and remove non-compliant material from waste. Such screening allows for the removal of hazardous materials or recyclable materials that are non-compliant with the type of waste currently being screened. For example, a load of waste may be for paper which is to be transferred to a paper recycling facility. The screening process of the embodiments disclosed herein would remove non-compliant waste from the paper waste load to mitigate problems at the paper recycling facility. For example, the screening process can remove paint cans or batteries from the paper waste load. In some embodiments, waste transfer facilities disclosed herein can remove recycling materials from a load of waste. That is, the non-compliant material is recycling material. For example, a load of waste may be construction and demolition waste. In this example, the active screening process disclosed herein can remove metals from the construction and demolition waste, which can be transferred to a subsequent facility for further processing. This reduces environmental issues within the community and at a subsequent facility, and allows the non-compliant material to be handled appropriately.

Embodiments disclosed herein can process any type of waste material. For example, embodiments disclosed herein can process yard waste, recycling waste, municipal household waste, construction and demolition waste, etc. The embodiments disclosed herein can screen these types of waste for non-compliant (e.g., hazardous) materials, which are subsequently removed and transferred to the proper facility.

The waste transfer facility of the disclosed embodiments includes a first level and a second level. The first level can include a first side for accepting a first type of waste (e.g., municipal household waste) and a second side for accepting a second type of waste (e.g., construction and demolition waste). In some embodiments, waste vehicles are directed to either the first side of the facility or the second side of the facility based on the type of waste that the waste vehicle is transporting. In some embodiments, an operator of the waste transfer facility directs the waste vehicle into a specific area (e.g., a bay) on the first level to begin unloading the waste. The second level of the waste transfer facility is on a lower level than the first level. In some embodiments, the second level includes a first waste receptacle adjacent to the first side of the first level, a second waste receptacle adjacent the second side of the first level, non-compliant waste receptacle, and a work vehicle. In some embodiments, the first and second waste receptacle can be a long haul trailer. In some embodiments, while the waste vehicles are unloading their waste into the first and second waste receptacles, an operator of the work vehicle is screening the waste and can operate the work vehicle to remove any non-compliant waste from the first waste receptacle and the second waste receptacle and place the non-compliant waste in the non-compliant waste receptacle. In some embodiments, the first waste receptacle, the second waste receptacle and the non-compliant waste receptacle are coupled to a transfer vehicle (e.g., a yard cab mover, a semi-truck, a truck, etc.) and removed from the facility. Subsequent waste receptacles are moved in to replace the receptacles that have been removed from the waste transfer facility and the process repeats. The layout and operation of the waste transfer facility allows for the reduction in non-compliant waste that is transferred to a subsequent site, thereby reducing environmental issues. The layout and operation of the waste transfer facility also improves waste transfer facility operations within a community as discussed above.

The principles discussed herein can be applied to any type of waste transfer facility. For example, the principles discussed herein can be applied to direct dumping transfer facilities, tipping floor dumping transfer facilities, pit-dumping facilities, compactor facilities, roll-off box facilities, or drop-off box facilities.

It should be recognized that the embodiments described in this disclosure can be combined in various ways. Any aspect or feature that is described in connection with one embodiment can be incorporated into any other embodiment mentioned in this disclosure. It should also be recognized that the inventive principles described in this disclosure are not limited to the particular embodiments illustrated in the figures.

In certain embodiments, a facility is provided comprising: a first level, the first level positioned at a first height, the first level including a first side for a first type of waste, and a second side for a second type of waste; and a second level, the second level positioned at a second height different than the first height, the second level including a plurality of waste receptacles, the plurality of waste receptacles including a first waste receptacle positioned adjacent to the first side to receive the first type of waste, a second waste receptacle positioned adjacent to the second side to receive the second type of waste, and a non-compliant waste receptacle to receive non-compliant waste, the non-compliant waste to be removed from the first type of waste and the second type of waste.

Moving on to the figures, FIG. 1 illustrates an exemplary waste transfer complex 100 according to certain embodiments. In the exemplary embodiment of FIG. 1, the waste transfer complex 100 includes a waste transfer facility 102, a road 104, a first unloading area 106, a second unloading area 108, waste vehicles 110, and a transfer area 112.

During operation, the waste vehicles 110 enter the waste transfer complex 100 via the road 104. In some embodiments, the first unloading area 106 corresponds to a first type of waste and the second unloading area 108 corresponds to a second type of waste. In such embodiments, the waste vehicles 110 are directed to either the first unloading area 106 or the second unloading area 108 based on the type of waste the waste vehicle 110 is transporting. In the illustrated embodiment, the waste vehicles 110 are positioned in the first unloading area 106. While in the first unloading area 106, the waste vehicles 110 unload their waste into waste receptacles positioned within the waste transfer facility 102. In some embodiments, multiple waste vehicles 110 unload their waste into the waste receptacles until the waste receptacles are full. Once the waste receptacles are full, a transfer vehicle (e.g., yard mover, semi-truck, truck, etc.) removes the waste receptacles via the transfer area 112 with is located at a different level than the first unloading area 106 and the second unloading area 108. In some embodiments, new waste receptacles are positioned within the waste transfer facility 102 via the transfer area 112.

Figure 2:
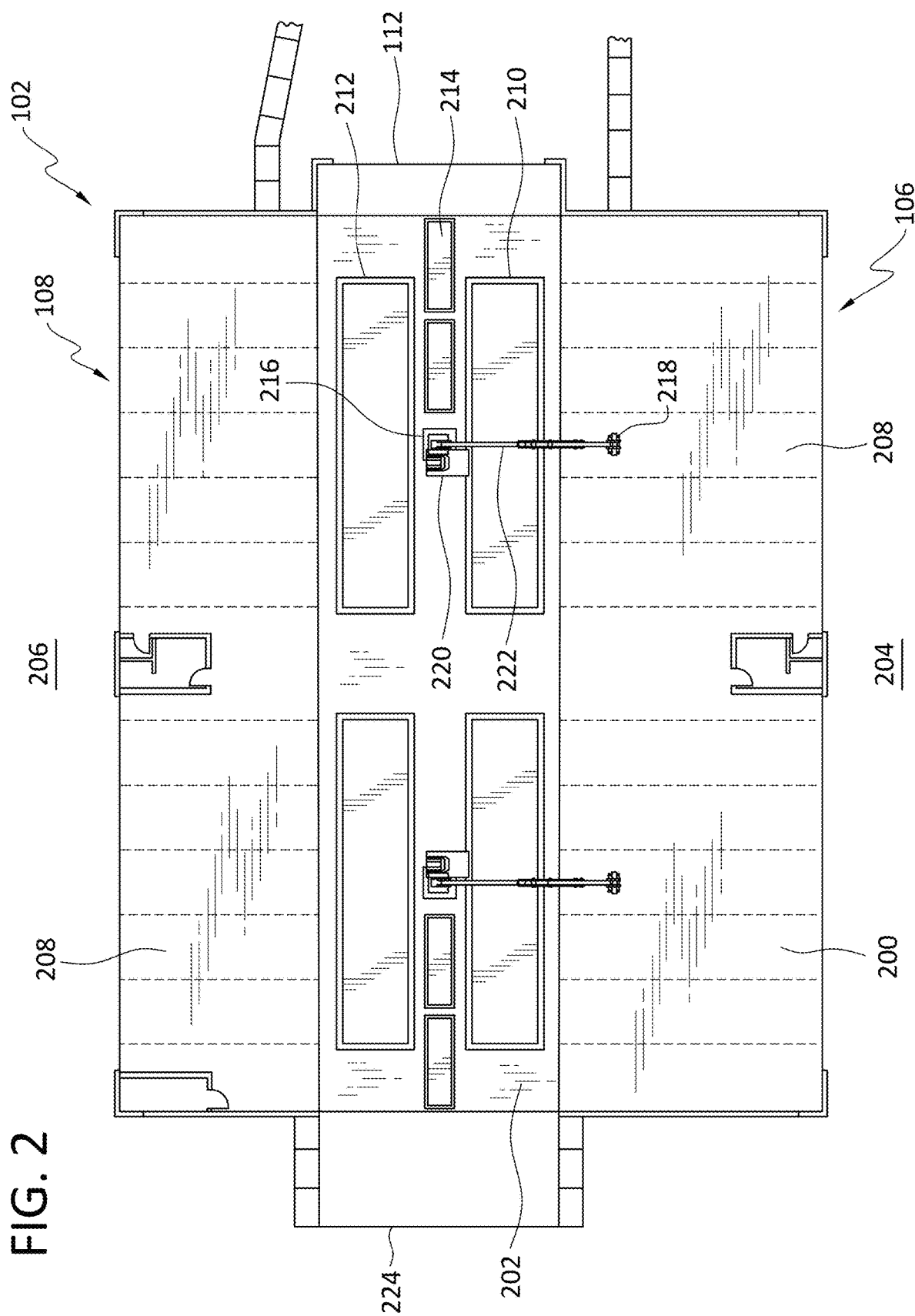
FIG. 2 is a top plan view of the exemplary waste transfer facility shown in FIG. 1 according to certain embodiments.

Turning to FIG. 2, a top plan view of the exemplary waste transfer facility 102 of FIG. 1 is illustrated. The waste transfer facility 102 of FIG. 2 includes a first level 200, and a second level 202. The first level 200 includes a first side 204 and a second side 206. In the illustrated embodiment, the first side 204 includes the first unloading area 106 and the second side 206 includes the second unloading area 108. In some embodiments, the first side 204 corresponds to a first type of waste and the second side 206 corresponds to a second type of waste. In some embodiments, the first side 204 and the second side 206 can receive any type of waste. In some embodiments, the first level 200 is positioned at a first height. In some embodiments, the first level 200 is positioned at a first height and the second level 202 is positioned at a second height lower than the first height. In some embodiments, the first level 200 is positioned at a first height and the second level 202 is positioned at a second height higher than the first height. In some embodiments, the first unloading area 106 and the second unloading area 108 include bays 208 or areas to receive the waste vehicles 110. In some embodiments, the waste vehicles 110 maneuver into the bays 208 to unload waste.

In the illustrated embodiment, the second level 202 includes a first waste receptacle 210 positioned adjacent to the first side 204 to receive a first type of waste, a second waste receptacle 212 positioned adjacent to the second side 206 to receive a second type of waste, and a non-compliant waste receptacle 214 positioned adjacent to the first waste receptacle 210 and the second waste receptacle 212 to receive non-compliant waste that is removed from the first type of waste from the first waste receptacle 210 and from the second type of waste from the second waste receptacle 212. In some embodiments, the first type of waste is municipal household waste and the second type of waste is construction and demolition waste. In some embodiments, the non-compliant waste is metals, paint cans, or any type of hazardous, recyclable, or non-compliant material that is non-compliant with a facility that is to subsequently process the first type of waste or the second type of waste. That is, the non-compliant material can be recyclable material and the non-compliant waste receptacle 214 is to receive the recyclable (e.g., non-compliant) material from the first waste receptacle 210 and/or the second waste receptacle 212. For example, the first type of waste can be for metal and will subsequently be transferred to a metal recycling facility. In some embodiments, non-compliant material in the first type of waste can be any material that is not metal and/or metal based, thereby reducing environmental issues and improving an efficiency at a subsequent facility. In some embodiments, the non-compliant material (e.g., non-compliant waste) can be another type of waste. For example, a load of municipal household waste can be unloaded and construction and demolition waste can be removed from the municipal household waste and transferred to a non-compliant waste receptacle 214 and transferred to a subsequent processing facility.

In some embodiments, the first side 204 and the second side 206 can receive any type of waste. That is, the waste vehicles 110 can unload their waste at either the first side 204 or the second side 206 regardless of the type of waste the waste vehicle 110 is unloading. In some embodiments, the first waste receptacle 210 and the second waste receptacle 212 can receive any type of waste. That is, the first waste receptacle 210 and the second waste receptacle 212 can be utilized to receive any type of waste that an operator will actively screen to remove non-compliant materials. For example, the first waste receptacle 210 can receive a first type of waste that is actively screened for non-compliant material. Subsequent to the first type of waste being actively screened, the first waste receptacle 210 can receive a second type of waste that is actively screened to remove non-compliant material.

In the illustrated embodiment, the second level 202 includes a work vehicle 216 positioned adjacent to the first waste receptacle 210, the second waste receptacle 212, and the non-compliant waste receptacle 214. The work vehicle 216 of the illustrated embodiment includes a tool 218. In some embodiments, the tool 218 is a pincher bucket, a claw, an electromagnet, forceps, or any type of work vehicle attachment to remove waste from a waste receptacle. In the illustrated embodiments, the tool 218 removes non-compliant waste from the first waste receptacle 210 and the second waste receptacle 212 and places the non-compliant waste in the non-compliant waste receptacle 214. In the illustrated embodiment, the work vehicle 216 includes a cabin 220 and a working arm 222. In some embodiments, the tool 218 is coupled to the working arm 222. The transfer facility 102 of the illustrated embodiment can include one or more work vehicles 216, first waste receptacles 210, second waste receptacles 212, and non-compliant waste receptacles 214 in different type of configurations. In some embodiments, the non-compliant waste receptacles 214 can be positioned perpendicular to the first and second waste receptacles 210, 212. In some embodiments, the non-compliant waste receptacles 214 can be positioned on the first level 200. In embodiments where the first level 200 is below the second level 202, the first waste receptacles 210, second waste receptacles 212, and non-compliant waste receptacles 214 can be positioned where the bays 208 are positioned in FIG. 2, and the bays 208 will be positioned where the first waste receptacles 210, second waste receptacles 212, and non-compliant waste receptacles 214 are positioned. In such an embodiment, the waste vehicles 110 would enter the waste transfer facility 102 in area 224.

During operation, the waste vehicles 110 reverse into the bays 208 and begin unloading waste. While the waste vehicles 110 are unloading waste, an operator in the cabin 220 of the work vehicle 216 actively screens the waste for non-compliant waste. When the operator identifies non-compliant waste, the operator operates the tool 218 and removes the non-compliant waste from the first waste receptacle 210 and/or the second waste receptacle 212 and puts the non-compliant waste in the non-compliant waste receptacle 214. That is, the operator in the cabin 220 is actively screening (e.g., monitoring) a load of waste while the load of waste is being unloaded into one of the first waste receptacle 210 or the second waste receptacle 212 and the operator utilizes the tool 218 to remove non-compliant materials while the load of waste is being unloaded. For example, a load of waste may be unloaded during an unloading period (e.g., 30 seconds, 2 minutes, 5 minutes, etc.). During the unloading period, the operator is actively screening the load of waste and may remove one or more loads of non-compliant material from the load of waste during the unloading period. When the first waste receptacles 210, second waste receptacles 212, and non-compliant waste receptacles 214 are full, or are at a waste threshold, transfer vehicles remove the first waste receptacles 210, second waste receptacles 212, and non-compliant waste receptacles 214 and transfer the first waste receptacles 210, second waste receptacles 212, and non-compliant waste receptacles 214 to their appropriate facility. New waste receptacles are placed in the second level 202 and the process repeats.

Figure 3:
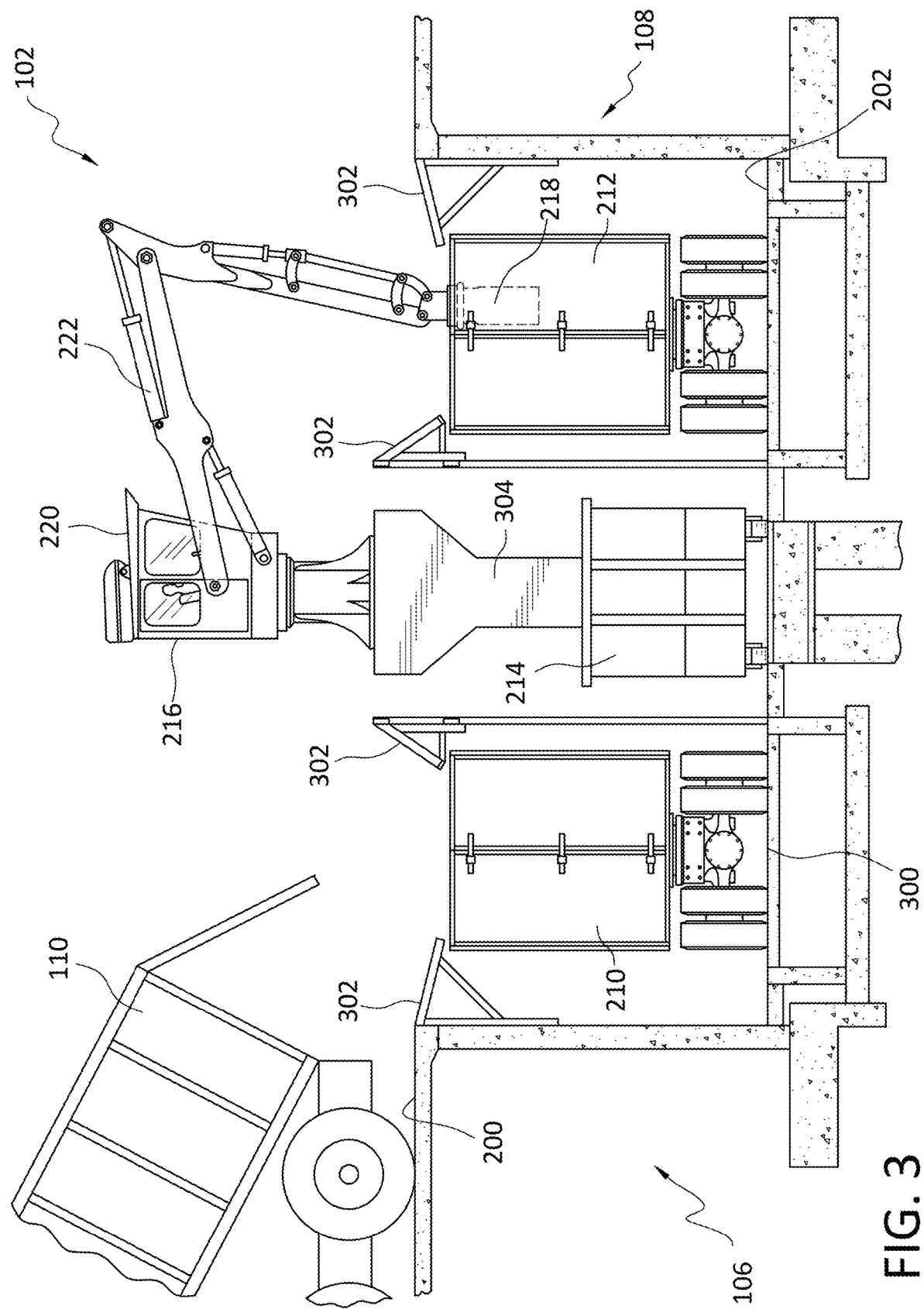
FIG. 3 is a side view of the exemplary waste transfer facility according to certain embodiments.

FIG. 3 illustrates a side view of the exemplary waste transfer facility 102. In the illustrated embodiment, the first waste receptacle 210, the second waste receptacle 212, and the non-compliant waste receptacle 214 are positioned above a ground surface 300 to mitigate contamination to the ground surface 300, thereby reducing environmental issues. In the illustrated embodiment, guards 302 are positioned around the first waste receptacle 210 and the second waste receptacle 212 to further mitigate contamination to the ground surface 300. In the illustrated embodiment, the first level 200 is located at a first height and the second level 202 is located at a second height. In some embodiments, the first height and the second height are positioned to allow an operator of the work vehicle 216 to screen for non-compliant waste from the waste vehicle 110 while the waste vehicle 110 is unloading waste into the first waste receptacle 210. In the illustrated embodiment, the work vehicle 216 is positioned on a structure 304 to further assist an operator of the work vehicle 216 in actively screening for non-compliant waste. In some embodiments, the structure 304 is sized to be positioned at a height above the first height of the first level 200. However, the structure 304 can be positioned at any height based on the size of the work vehicle 216.

Figure 4:
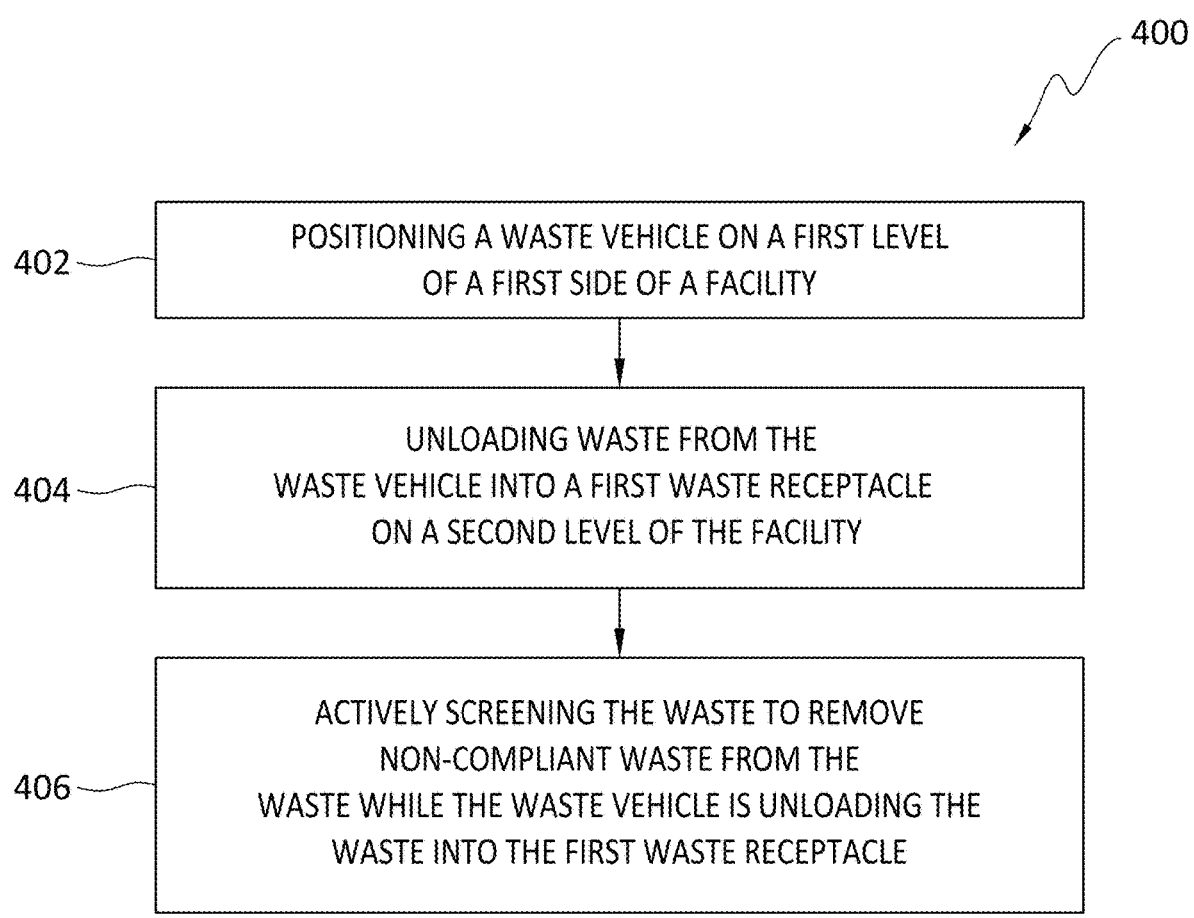
FIG. 4 is a method for screening and removing non-compliant waste.

FIG. 4 is a method 400 for screening and removing non-compliant waste. The method 400 begins at block 402 by positioning a waste vehicle on a first level of a first side of a facility. In some embodiments, the method includes positioning a waste vehicle 110 on the first level 200 in the first unloading area 106 corresponding to a first type of waste. In some embodiments, the method includes positioning a waste vehicle 110 on the first level 200 in either the first unloading area 106 or the second unloading area 108.

In some embodiments, the method 400 includes positioning a second waste vehicle on the first level of a second side of the facility. In some embodiments, the method includes positioning a waste vehicle 110 on the first level 200 in the second unloading area 108 corresponding to a second type of waste.

The method 400 continues at block 404 by unloading waste from the waste vehicle into a first waste receptacle on a second level of the facility. In some embodiments, the method 400 includes unloading waste from the waste vehicle 110 in the first unloading area 106 into the first waste receptacle 210 on the second level 202. In some embodiments, the method 400 includes unloading i) a first type of waste from the first waste vehicle into a first waste receptacle on a second level of the facility and ii) a second type of waste from the second waste vehicle into a second waste receptacle on the second level of the facility. In some embodiments, the method includes unloading a first type of waste from the waste vehicle 110 in the first unloading area 106 into the first waste receptacle 210 on the second level 202 and unloading a second type of waste from the waste vehicle 110 in the second unloading area 108 into the second waste receptacle 212 on the second level 202.

The method 400 continues at block 406 by actively screening the waste to remove non-compliant waste from the waste while the waste vehicle is unloading the waste. In some embodiments, the method includes an operator of a work vehicle 216 actively screening a load of waste from the waste vehicle 110 to remove one or more loads of non-compliant materials from the load of waste during an unloading period. In some embodiments, the method includes continuously screening the load of waste after the unloading period has ended (e.g., when all of the waste is in a waste receptacle). In some embodiments, the method includes removing non-compliant waste from the first type of waste and the second type of waste while the first waste vehicle is unloading the first type of waste and the second waste vehicle is unloading the second type of waste. In some embodiments, the method includes removing non-compliant waste from the first type of waste and the second type of waste while the waste vehicle 110 in the first unloading area 106 and the waste vehicle 110 in the second unloading area 108 are unloading their respective waste.

In some embodiments, the method 400 includes placing the non-compliant waste in a non-compliant waste receptacle to mitigate contaminating a ground surface. For example, placing the non-compliant waste in the non-compliant waste receptacle 214 to mitigate contaminating the ground surface 300. In some embodiments, the non-compliant waste is recyclable material. In such embodiments, the non-compliant waste is removed from a load of waste to mitigate contaminating a subsequent processing facility.

In some embodiments, the method 400 includes removing the first waste receptacle, the second waste receptacle and the non-compliant waste receptacle from the facility. The method 400 repeats.

It should be recognized that numerous variations can be made to the above-described systems and methods without departing from the scope of the invention.

While various novel features of the invention have been shown, described, and pointed out as applied to particular embodiments thereof, it should be understood that various omissions, substitutions and changes in the form and details of the systems and methods described and illustrated may be made by those skilled in the art without departing from the spirit of the invention. Amongst other things, the steps shown in the methods may be carried out in different orders in many cases, where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the particular system components are for illustrative purposes to facilitate a full and complete understanding and appreciation of the various aspects and functionality of particular embodiments of the invention, as realized in system and method embodiments thereof. Those skilled in the art will appreciate that the invention can be practiced in other than the described embodiments, which are presented for purposes of illustration and not limitation.

What is claimed is:

1. A facility comprising:
a first level, the first level positioned at a first height, the first level including a first side, and a second side; and
a second level, the second level positioned at a second height different than the first height, the second level including a plurality of waste receptacles, the plurality of waste receptacles including a first waste receptacle positioned adjacent to the first side to receive waste, a second waste receptacle positioned adjacent to the second side to receive waste, and a non-compliant waste receptacle to receive non-compliant waste, the non-compliant waste to be removed from the waste, wherein:
the second level includes a work vehicle positioned adjacent to the first waste receptacle, the second waste receptacle, and the non-compliant waste receptacle; and
the work vehicle includes a tool, the tool to remove the non-compliant waste from the first waste receptacle and the second waste receptacle and place the non-compliant waste in the non-compliant waste receptacle.

2. The facility of claim 1, wherein the first waste receptacle, the second waste receptacle and the non-compliant waste receptacle are positioned above a ground surface to mitigate contamination to the ground surface.

3. The facility of claim 1, wherein the work vehicle further includes a cabin and a working arm, the working arm including the tool.

4. The facility of claim 1, wherein the non-compliant waste is recyclable material.

5. The facility of claim 1, wherein the work vehicle is to remove the non-compliant waste while the waste is being placed in the first waste receptacle.

6. The facility of claim 1, further including a first transfer vehicle to remove the first waste receptacle from the facility, a second transfer vehicle to remove the second waste receptacle from the facility, and a third transfer vehicle to remove the non-compliant waste receptacle from the facility.

7. A method comprising:
   positioning a waste vehicle on a first level of a first side of a facility;
   unloading waste from the waste vehicle into a first waste receptacle on a second level of the facility; and
   removing non-compliant waste from the waste via a work vehicle positioned adjacent to the first waste receptacle while the waste vehicle is unloading the waste into the first waste receptacle.

8. The method of claim 7, wherein the waste vehicle is a first waste vehicle, further including positioning a second waste vehicle on the first level of a second side of the facility.

9. The method of claim 8, wherein the waste is a first type of waste, further including unloading a second type of waste from the second waste vehicle into a second waste receptacle on the second level of the facility.

10. The method of claim 9, further including actively screening one of the first type of waste or the second type of waste to remove non-compliant waste from the one of the first type of waste or the second type of waste while the first waste vehicle is unloading the first type of waste or the second waste vehicle is unloading the second type of waste.

11. The method of claim 10, further including placing the non-compliant waste in a non-compliant waste receptacle to mitigate contaminating a ground surface.

12. The method of claim 11, further including removing the first waste receptacle, the second waste receptacle and the non-compliant waste receptacle from the facility.

13. A facility comprising:
   a first level, the first level positioned at a first height, the first level including a first side, and a second side; and
   a second level, the second level positioned at a second height different than the first height, the second level including a plurality of waste receptacles, the plurality of waste receptacles including a first waste receptacle positioned adjacent to the first side to receive waste, a second waste receptacle positioned adjacent to the second side to receive waste, and a non-compliant waste receptacle to receive non-compliant waste, the non-compliant waste to be removed from the waste, wherein:
      the second level includes a work vehicle positioned adjacent to the first waste receptacle, the second waste receptacle, and the non-compliant waste receptacle; and
      the work vehicle is to remove the non-compliant waste while the waste is being placed in the first waste receptacle.

* * * * *